US012602717B2

(12) United States Patent
Allione

(10) Patent No.: US 12,602,717 B2
(45) Date of Patent: Apr. 14, 2026

(54) APPARATUS, METHOD, AND COMPUTER-READABLE STORAGE MEDIUM FOR CONTEXTUALIZED EQUIPMENT RECOMMENDATION

(71) Applicant: ESSILOR INTERNATIONAL, Charenton-le-Pont (FR)

(72) Inventor: Pascal Allione, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 958 days.

(21) Appl. No.: 17/785,277

(22) PCT Filed: Dec. 16, 2020

(86) PCT No.: PCT/EP2020/086448
§ 371 (c)(1),
(2) Date: Jun. 14, 2022

(87) PCT Pub. No.: WO2021/122768
PCT Pub. Date: Jun. 24, 2021

(65) Prior Publication Data
US 2023/0010378 A1    Jan. 12, 2023

(30) Foreign Application Priority Data

Dec. 17, 2019    (EP) .................................... 19306661

(51) Int. Cl.
*G06Q 30/0601*        (2023.01)
*G02C 13/00*          (2006.01)
(Continued)

(52) U.S. Cl.
CPC ....... *G06Q 30/0631* (2013.01); *G02C 13/003* (2013.01); *G06Q 30/0643* (2013.01); *G06V 40/165* (2022.01); *G02C 7/027* (2013.01)

(58) Field of Classification Search
CPC ........... G06Q 30/0631; G06Q 30/0643; G06Q 30/0621; G02C 13/003; G02C 7/027; G06V 40/165; G06V 40/161; G06N 20/00
See application file for complete search history.

(56) References Cited

U.S. PATENT DOCUMENTS 6,944,327 B1 *  9/2005  Soatto .................. G02C 13/003
                                            351/159.75
7,490,042 B2 *  2/2009  Eide ...................... G10L 13/027
                                            379/88.04
(Continued)

OTHER PUBLICATIONS

Chengming et al., Research on Application of Machine Learning Intelligent Computing and Hyperspectral Remote Sensing Image Classification, May 31, 2018, pp. 88-95. (partial English machine translation provided).

(Continued)

*Primary Examiner* — Solomon G Bezuayehu
(74) *Attorney, Agent, or Firm* — NIXON & VANDERHYE

(57)        ABSTRACT

The present disclosure relates to a method for providing a user with a contextualized evaluation of a fit of frames of eyeglasses to their face. In particular, the present disclosure relates to a method, comprising receiving user data describing features of the face of the user, receiving equipment data describing features of the eyeglass frame, generating, according to a first model, values for a set of specific criteria describing compatibility between the face of the user and the eyeglass frame, the first model trained to associate user data and equipment data with values of specific criteria, generating, according to a second model, a value of a global criterion based on the generated values for the set of specific criteria, the second model trained to associate the values of specific criteria with values of global criteria, determining a
(Continued)

message characterizing the eyeglass frame with respect to the face of the user.

15 Claims, 21 Drawing Sheets

(51) Int. Cl.
  *G06V 40/16*          (2022.01)
  *G02C 7/02*           (2006.01)

(56)            References Cited

U.S. PATENT DOCUMENTS

|  |  |  |  |
|---|---|---|---|
| 9,341,867 B1* | 5/2016 | Kim | A61B 3/0025 |
| 2005/0200963 A1* | 9/2005 | Hoke | G02B 27/026 |
|  |  |  | 359/630 |
| 2013/0132898 A1* | 5/2013 | Cuento | G02C 7/027 |
|  |  |  | 715/810 |
| 2014/0344102 A1* | 11/2014 | Cooper | G06Q 30/0631 |
|  |  |  | 705/26.7 |
| 2015/0055085 A1 | 2/2015 | Fonte et al. |  |
| 2016/0162965 A1* | 6/2016 | Lee | G02C 13/003 |
|  |  |  | 705/26.5 |
| 2017/0169501 A1 | 6/2017 | Xia |  |
| 2017/0330264 A1 | 11/2017 | Youssef et al. |  |
| 2018/0268458 A1* | 9/2018 | Popa | G06V 40/169 |
| 2019/0164210 A1* | 5/2019 | Kornilov | G06V 40/165 |

OTHER PUBLICATIONS

Fengying et al., Research on Realization Technology and Development of Artificial Intelligence, Jul. 31, 2019, pp. 226-233. (partial English machine translation provided).
Office Action, issued in Chinese Patent Application No. 202080087488.X dated Dec. 28, 2024. (English machine translation provided).
International Search Report and Written Opinion of the ISA for PCT/EP2020/086448 dated Feb. 12, 2021, 13 pages.

* cited by examiner

200

210 — RECEIVE USER DATA

220 — RECEIVE EQUIPMENT DATA

230 — GENERATE SPECIFIC CRITERIA VALUES

240 — GENERATE GLOBAL CRITERION VALUE

250 — DETERMINE MESSAGE CHARACTERISING FIT

260 — OUTPUT THE MESSAGE TO THE USER

201

<u>201</u>

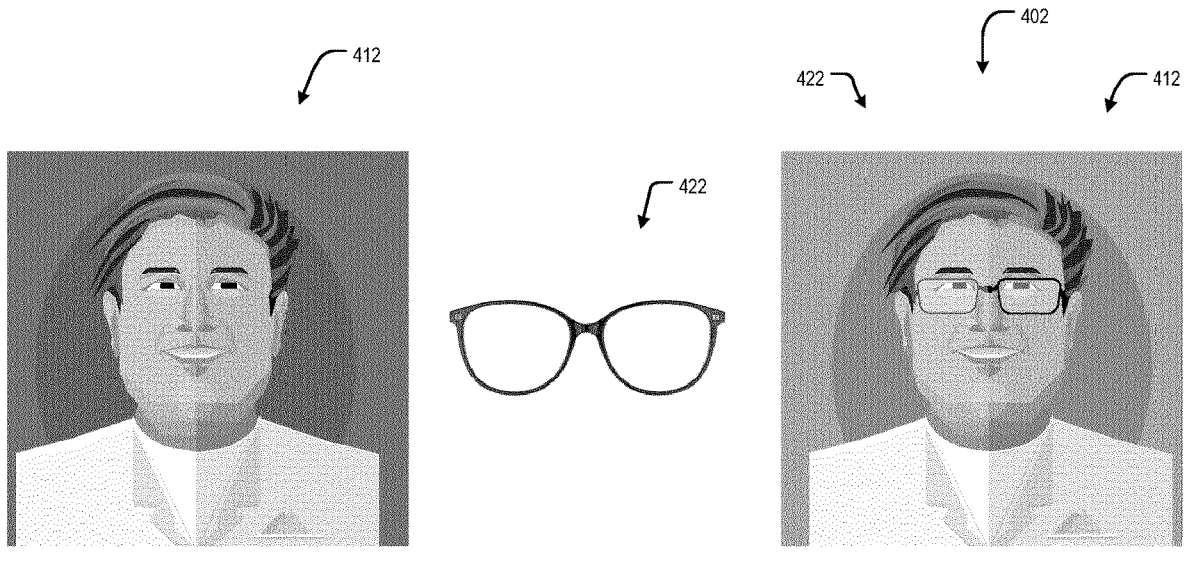
FIG. 4A                    FIG. 4B                    FIG. 4C

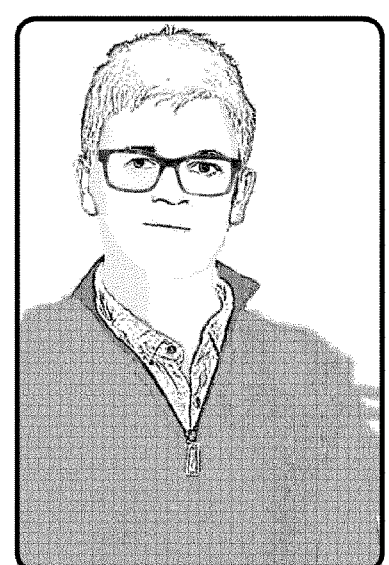

SPECIFIC CRITERIA

1/ Relative to the width of the face of the user, how do you evaluate the width of the equipment ?
Too small            Okay                    Too large
   ○                  ●                        ○

2/ Relative to the caliber of the equipment, how do you evaluate the pupils of the user ?
Too internal         Okay                    Too external
   ○                  ●                        ○

3/ What do you think about the position of the external corners of the eyebrows of the user relative to the caliber of the equipment ?
Too internal         Okay                    Too external
   ○                  ●                        ○

4/ Relative to the eyebrows of the user, how do you evaluate the position of the top of the frame of the equipement ?
Too low              Okay                    Too high
   ○                  ●                        ○

5/ Relative to the cheeks of the user, how do you evaluate the position of the bottom of the frame of the equipment ?
Too low              Okay                    Too high
   ○                  ●                        ○

6/ Relative to the nose of the wearer, how do you evaluate the bridge of the frame of the equipment ?
Too narrow           Okay                    Too large
   ○                  ●                        ○

GLOBAL CRITERION

○    ○        In terms of sizes, does the frame that this person is wearing suit him?
  YES   NO

DECISION TREE → ECP ANNOTATION → ANNOTATED DECISION TREE

APPARATUS, METHOD, AND COMPUTER-READABLE STORAGE MEDIUM FOR CONTEXTUALIZED EQUIPMENT RECOMMENDATION

CROSS-REFERENCE TO RELATED APPLICATIONS

This application is the U.S. national phase of International Application No. PCT/EP2020/086448 filed Dec. 16, 2020 which designated the U.S. and claims priority to EP Patent Application No. 19306661.0 filed Dec. 17, 2019, the entire contents of each of which are hereby incorporated by reference.

BACKGROUND

FIELD OF THE DISCLOSURE

The present disclosure relates to eyewear and, specifically, to matching of visual equipment with user faces.

DESCRIPTION OF THE RELATED ART

During the selection of new visual equipment, or eyewear, a user is often left to self-reflection in determining the aesthetics of new eyewear on their face. Moreover, when deciding between multiple pieces of eyewear, a user may find it difficult to decide which piece is most attractive, has the most utility, or is the most suited to their particular facial bone structure and features. At the same time, the patient may be grappling with their own opinion of the new eyewear on their face and the hypothetical opinions of third parties (e.g., friends, family, professionals, etc.) regarding the fit of the new eyewear on their face.

As demonstrated above, considering the aesthetic appeal together with the eyewear necessity of proper vision, the task of eyewear selection can be burdensome, with no effective way of confidently purchasing a new set of eyewear that the user, the user's doctor, and the user's friends are sure to be pleased with. The present disclosure provides a solution to this issue.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus, method and computer-readable storage medium for contextualized equipment recommendation.

According to an embodiment, the present disclosure is further related to a method for providing contextual evaluation of an eyeglass frame on a face of a user, comprising receiving user data describing features of the face of the user, receiving equipment data describing features of the eyeglass frame, generating, according to a first model, values for a set of specific criteria describing compatibility between the face of the user and the eyeglass frame based on the received user data and the received equipment data, the first model trained to associate user data and equipment data with values of specific criteria, generating, by processing circuitry and according to a second model, a value of a global criterion based on the generated values for the set of specific criteria, the second model trained to associate the values of specific criteria with values of global criteria, determining a message characterizing the eyeglass frame with respect to the face of the user, the message being associated with the generated value of the global criterion and with the generated values for the set of specific criteria, and outputting the message to the user.

According to an embodiment, the present disclosure is further related to an apparatus for providing contextual evaluation of an eyeglass frame on a face of a user, comprising processing circuitry configured to receive user data describing features of the face of the user, receive equipment data describing features of the eyeglass frame, determine, according to a first model, values for a set of specific criteria describing compatibility between the face of the user and the eyeglass frame based on the received user data and the received equipment data, the first model trained to associate user data and equipment data with values of specific criteria, generate, according to a second model, a value of a global criterion based on the generated values for the set of specific criteria, the second model trained to associate the values of specific criteria with values of global criteria, determine a message characterizing the eyeglass frame with respect to the face of the user, the message being associated with the generated value of the global criterion and with the generated values for the set of specific criteria, and output the message to the user.

According to an embodiment, the present disclosure is further related to a non-transitory computer-readable storage medium storing computer-readable instructions that, when executed by a computer, cause the computer to perform a method for providing contextual evaluation of an eyeglass frame on a face of a user, comprising receiving user data describing features of the face of the user, receiving equipment data describing features of the eyeglass frame, generating, according to a first model, values for a set of specific criteria describing compatibility between the face of the user and the eyeglass frame based on the received user data and the received equipment data, the first model trained to associate user data and equipment data with values of specific criteria, generating, according to a second model, a value of a global criterion based on the generated values for the set of specific criteria, the second model trained to associate the values of specific criteria with values of global criteria, determining a message characterizing the eyeglass frame with respect to the face of the user, the message being associated with the generated value of the global criterion and with the generated values for the set of specific criteria, and outputting the message to the user.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is an illustration of an image of a face of a user, according to an exemplary embodiment of the present disclosure;

FIG. 4B is an illustration of an image of an eyeglass frame, according to an exemplary embodiment of the present disclosure;

FIG. 4C is an illustration of an image of a user wearing an eyeglass frame, according to an exemplary embodiment of the present disclosure;

FIG. 6B is an illustration of a survey administered to eye care professionals, according to an exemplary embodiment of the present disclosure;

FIG. 8A is a graphical representation of responses to a survey administered to eye care professionals, according to an exemplary embodiment of the present disclosure;

DETAILED DESCRIPTION

Figure 1:
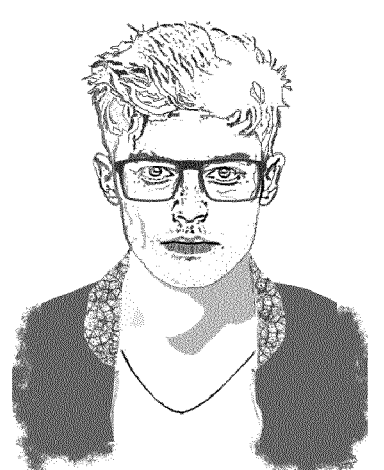
FIG. 1 is an illustration of a user wearing an eyeglass frame, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The terms "visual equipment", "equipment", "equipments", "eyeglass frame", "eyeglass frames", "eyeglass", "eyeglasses", and "visual equipments" may be used interchangeably to refer to an apparatus having both a frame and a lens. The term "visual equipment" may be used to refer to a single visual equipment while the term "visual equipments" may be used to refer to more than one visual equipment.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Similarly, the terms "image of a face" and "image of a face of a person" are corresponding terms that may be used interchangeably. Thus, the appearances of such phrases or in various places throughout this specification are not necessarily all referring to the same embodiment. Furthermore, the particular features, structures, or characteristics may be combined in any suitable manner in one or more embodiments without limitation.

Today, patients, users, or consumers in search of eyeglasses are often left with little guidance as to what is both ophthalmologically appropriate and aesthetically pleasing. For some, cultural trends drive their decision making. For others, the opinion of friends and family is most important. For others still, who prioritize an ergonomic fit and visual acuity, the opinion of a trained eye care professional (ECP) is a necessity.

Currently, users have access to approaches that provide some but not all of the above-described features. For instance, one approach describes implementation of a decision tree to match eyeglass frames with morphological features detected from landmarks on the face of an individual, the match determining a pair of eyeglasses that best matches the individual. In another approach, a user questionnaire may be used to match style preferences of the user to available eyeglass frames. In either scenario, and as is the case generally, these approaches provide a user with knowledge that a particular pair of eyeglasses does or does not it. These approaches do not, however, provide context to the determination. For example, while these approaches may be able to recommend an eyeglass frame to a user based on style preferences in view of best-selling rankings and the like, the recommendation ultimately reflects a single 'best fit' metric. The single 'best fit' metric, while based on underlying features of the eyeglass frames and the user, provides an oversimplification of the 'fit' of the eyeglass frame and fails to convey to the user why the recommended eyeglass frame is the 'best fit'. In certain cases, the oversimplification may be a quantitative metric (e.g. between 1 and 10) based on a global mark of the eyeglass frame or specific criteria, leaving interpretation of the metric to an ECP. In this way, while providing a user with the knowledge that a particular pair of eyeglasses does or does not fit, these approaches fail to provide textual context to a user regarding why such a determination was made (e.g., why the frame fits or does fit according to specific features thereof).

U.S. Patent Application Publication No. 2017/169501 describes a database including eyeglass models, user face models, and an eyeglass fit evaluation model based on a fitting evaluation matrix. While providing a fit output, the eyeglass fit evaluation model only generates a single, global metric in determining the fit of a certain eyeglass to a face of a user.

According to an embodiment, the present disclosure describes an apparatus, a method, and a computer-readable storage medium for providing contextual evaluation of an eyeglass frame on a face of a user.

In an embodiment, the present disclosure provides for the association of different textual descriptions for each of a subset of possible values taken by criterion linked to a global or specific attribute of suitability of an eyeglass relative to a user face.

In an embodiment, the present disclosure includes an automatic diagnostic system for determining a fit between an eyeglass and a user. The automatic diagnostic system may generate at least one fit metric value and an associated textual description explaining the reasons why the eyeglass does or does not suit the face of the user. In an example, the at least one fit metric and the associated textual description can be based on one or more photos of the user, user information including eyeglass prescription, age, gender and the like, and equipment features including size, color, materials, and the like.

In an embodiment, the present disclosure concerns an apparatus, method, and computer-readable storage medium for providing the determination of user data describing features of the face of the user and the determination of equipment data describing features of the eyeglass frame from at least one picture of the said user wearing the said eyeglass. Digital image processing and other image processing methods can be used to separate user features from frame features. The user data may be morphological features, structural features, and aesthetic features of the face of the user. The equipment data may be features including total width of the frame of the equipment, dimensions of aspects of the frame of the equipment (e.g., Size A, Size B, Size D, etc.), vertical thickness of the top part of the frame of the equipment, horizontal thickness of the frame of the equipment at the level of the hinge, color of the equipment, material of the equipment, and the like. The at least one picture of the face of the user can be produced with a 2D or 3D camera, or other image capture device configured to acquire images of users, eyewear, and the like. At least one fit metric value and an associated textual description explaining the reasons why the eyeglass does or does not suit the face of the user can be generated from the determined user data and equipment data.

According to an exemplary embodiment, the present disclosure describes a machine learning-based frame fit evaluation device (i.e., eyeglass evaluation tool) for presenting a user with a fitted eyeglass selection based upon morphological and structural features (i.e., user features and equipment features), ophthalmological demands (i.e. visual prescriptions), and aesthetic appeal.

According to an exemplary embodiment, the present disclosure includes a method for equipment recommendation based on: (1) user features, equipment features, and positional data of worn equipment, (2) a set of criteria values, specific and global, related to fit of the equipment, (3) global criterion based on a global score, grade, or acceptance of fit of the equipment, and (4) specific criteria based on a score, grade, or acceptance of specific fit parameters, wherein the global criterion can be derived from the specific criteria.

As introduced above, the present disclosure provides eyeglass recommendations and evaluations with textual context, allowing a user to understand why equipment does or does not fit. The evaluations can be based on criteria values, both global and specific, that are determined from models generated by machine learning-based approaches. Each of the machine learning-based approaches can include datasets annotated by ECPs, the annotations providing labels for each of the specific criteria and the global criterion for a corresponding pair of user features and equipment features.

In an embodiment, the present disclosure may provide a global criterion as modified by only relevant specific criteria.

In an embodiment, the present disclosure may provide a global criterion, a specific criteria, or textual information directly to a user.

In an embodiment, the first and second models can be updated based on ECP recommendations. The ECP associate a frame model—or its geometrical features—to a picture of the face of a user and declares the score to a central server via a network. As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G, 4G and 5G wireless cellular systems. The wireless network can also be WiFi, Bluetooth, or any other wireless form of communication that is known. The models are updated in real time and other ECPs benefit from the update when determining a fit between an eyeglass and a user.

In an embodiment, global criterion can be derived from values of specific criteria using machine learning-based approaches. The machine learning-based approaches can include classification and regression trees and/or linear or non-linear combinations of models of specific criteria.

According to an embodiment, the present disclosure provides multiple criteria ECP input and machine learning-based multiple related models. These machine learning-based models are not limited to only global criterion, instead providing textual information regarding specific criteria deemed most relevant to the overall 'fit' of a frame, or equipment. For instance, it may be determined that equipment does not fit a user well and that the primary driver for this ill-fit is the thickness of the frame of the equipment. Therefore, the user may search for similarly related equipment with reduced thickness frames in order to improve their overall 'fit'.

According to an embodiment, the present disclosure relates to an apparatus, method, and computer-readable storage medium for providing a contextualized evaluation of an equipment data when other equipment data are provided. Such a method is illustrated on FIG. 12. When presented with a first set of equipment data where an equipment data is missing, methods of the present disclosure compare the set of data to set of data of a database comprising at least one set of equipment data. The mean value of the missing data from frames of the database having similar other features is then calculated. For instance, the mean thickness of the frame can be calculated knowing that it is a frame for women in plastic. The database can provide suggestions of equipments having a missing data value equal or close to the calculated mean value of the missing data and having other values equal or close to the other values of the first set of equipment data. The tolerance value on the missing data value or on one or several other data can be individually selected for each data by the user.

According to an embodiment, the present disclosure describes an apparatus, method, and computer-readable storage medium for providing a contextualized evaluation of a fit of equipment and a face of a user. When presented with an image of a user wearing equipment, methods of the present disclosure process the image such that a global criterion (i.e. universal fit metric) can be provided with context of features that contribute to the global criterion (e.g. specific criteria). In other words, the methods herein may determine the equipment and the face of the user to be a good match, however, the recommendation may be qualified by stating that the equipment and the face of the user are a good match because the relative distance between the centers of the lenses of the equipment and the interpupillary distance is aesthetically appropriate. Or, in an embodiment, the recommendation may be qualified by stating the equipment and the face of the user are a good match because the distance between the centers of the lenses is smaller than the interpupillary distance, the pupils of the user then being positioned closer to a nasal component of the lenses of the equipment.

According to an embodiment, the above-described multiple criteria ECP input and machine learning-based multiple related models provide for increasingly robust and accurate results for contextualized global criterion.

Turning now to the Figures, FIG. 1 is an illustration of a user wearing an eyeglass frame, according to an exemplary embodiment of the present disclosure. The illustration of FIG. 1 can be an input to the method of the present disclosure, in an example. Features of the user and features of the equipment can be determined therefrom. In this spirit, it can be appreciated that an input to the method of the present disclosure may, alternatively or in addition, be an image of a face of a user, an image of equipment, or user features data and equipment features data previously determined from like images.

Figure 2:
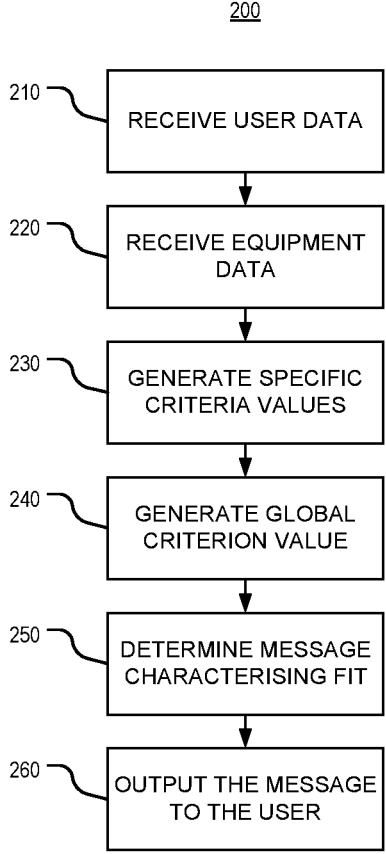
FIG. 2 is a flow diagram of a method for providing contextual evaluation of an eyeglass frame, according to an exemplary embodiment of the present disclosure.

Inputs similar to FIG. 1 may be applied to a method of the present disclosure as in FIG. 2, which describes an implementation of the methods of the present disclosure.

FIG. 2 is a flow diagram of a method for providing contextual evaluation of an eyeglass frame, according to an exemplary embodiment of the present disclosure. It can be appreciated that method 200 can be performed by a frame fit evaluation device, the frame fit evaluation device including processing circuitry configured to perform the steps described herein. The frame fit evaluation device will be described in greater detail with reference to FIG. 11.

Figure 3A:
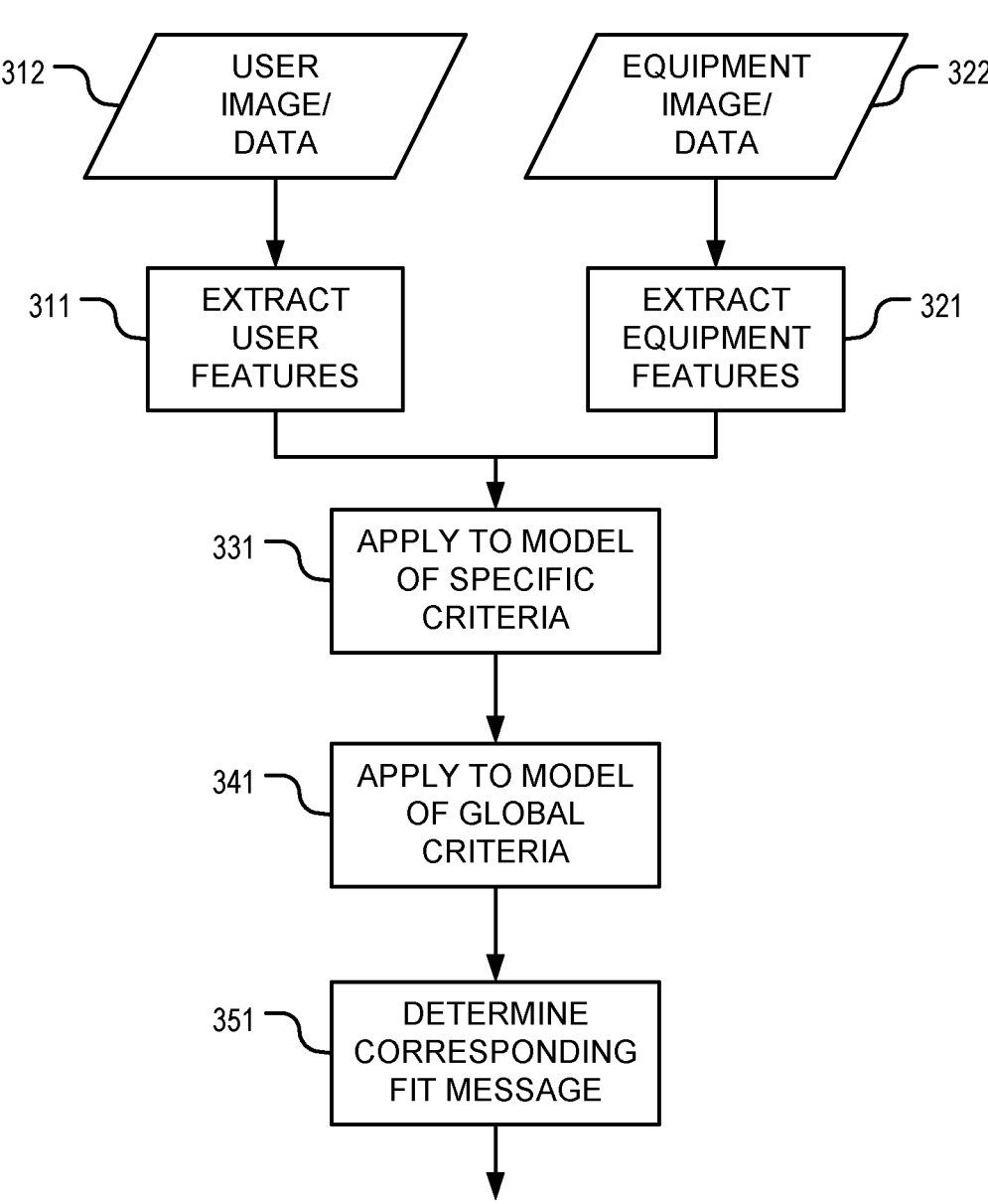
FIG. 3A is a flow diagram of a method for providing contextual evaluation of an eyeglass frame, according to an exemplary embodiment of the present disclosure.
Figure 3B:
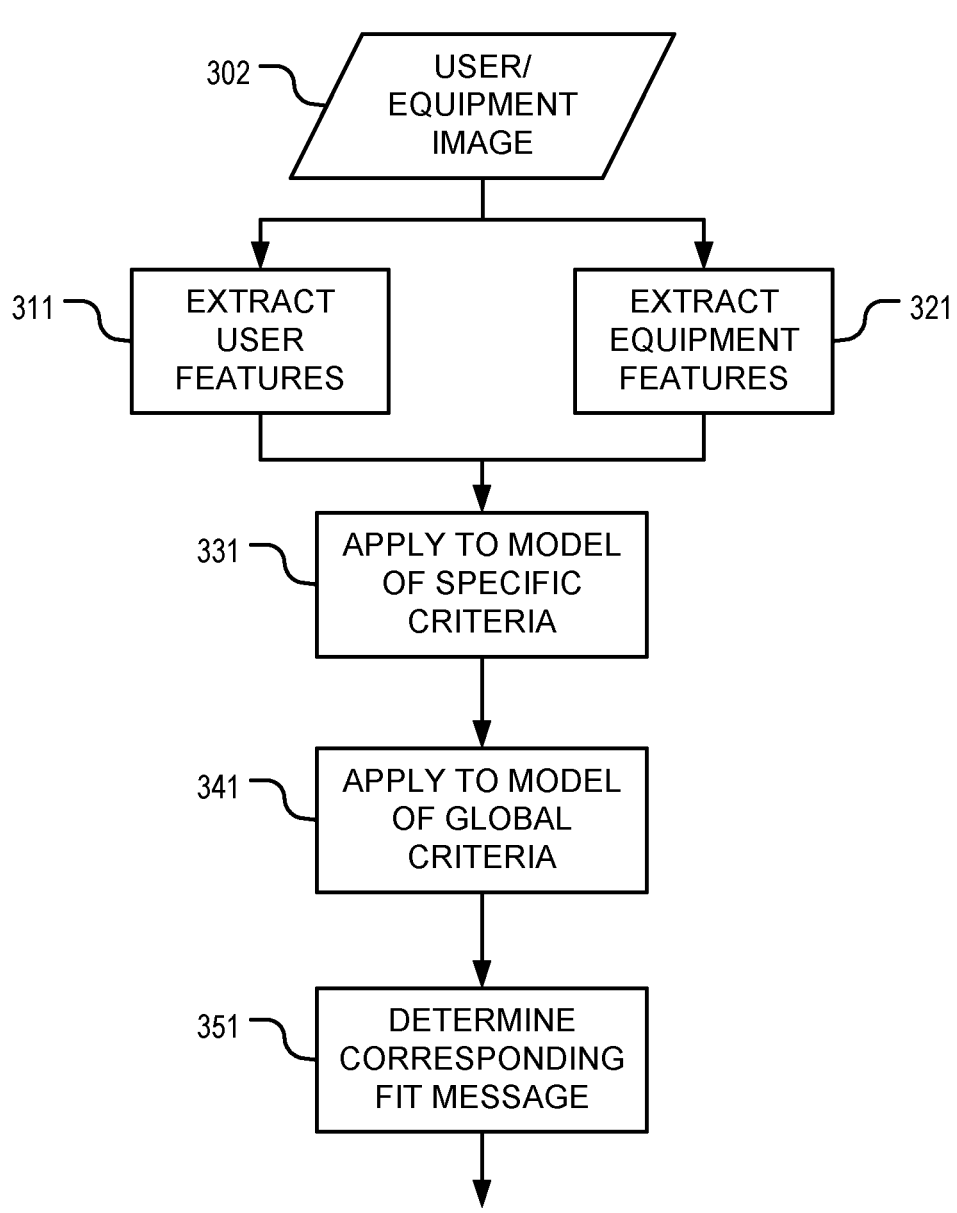
FIG. 3B is a flow diagram of a method for providing contextual evaluation of an eyeglass frame, according to an exemplary embodiment of the present disclosure.

At step 210 of method 200, user data may be received. The user data can be, as discussed with reference to FIG. 3A and FIG. 3B, provided directly as user features or can be determined from images containing a face of the user.

At step 220 of method 200, equipment data may be received. The equipment data can be, as discussed with reference to FIG. 3A and FIG. 3B, provided directly as equipment features or can be determined from images containing equipment.

At step 230 of method 200, specific criteria values can be generated by applying the above user features and equipment features to a machine learning-based model of specific criteria. Values of specific criteria metrics can be based on a set of specific criteria metrics directed to suitability of equipment and a face of a user, according to particular morphological, aesthetic, or visual considerations. In an embodiment, the specific criteria can be numeric values and continuous quantities, such as probabilities, combinations of quantities, scores, and the like. For instance, the specific criteria may define an interpupillary distance of a user. In an embodiment, the specific criteria can be qualitative quantities that may be defined by alphanumeric values. For instance, a qualitative quantity may represent an evaluation, by an ECP, of a width of a frame of equipment relative to a width of a face of a user. The ECP may then decide whether the relative width is (a) too wide, (b) acceptable, or (c) too narrow. In another instance, a qualitative quantity may represent an evaluation, by an ECP, of a presence of an eyebrow of a user within frames of equipment. The ECP may then decide whether (a) the eyebrow is visible inside the frames, (b) eyebrow positioning is acceptable, or (c) the eyebrow is too high above the frames. Such examples are merely representative of a variety of qualitative quantities that are relevant to frame fit and that may be evaluated by an ECP.

At step 240 of method 200, a global criterion value can be generated by applying the generated specific criteria values to a machine learning-based model of global criterion. In an embodiment, the global criterion value can be further based on the above-defined user features and equipment features. The global criterion value can be a numeric or qualitative value indicating a global suitability of equipment to the face of the user. In an embodiment, a machine learning-based model may be used to generate the global criterion value from the generated specific criteria values. The machine learning-based model may be a decision tree generated by a classification and regression tree or may be a linear regression of the specific criteria values.

According to an embodiment, in each of step 230 and step 240, specific criteria values and global criterion values can be determined according to machine learning-based approaches generated based on input from ECPs. For instance, the machine learning-based approaches may be based on ECP assessment and input of specific criteria values and global criterion for a given set of images of worn equipment, as will be described later.

At step 250 of method 200, the specific criteria values generated at step 230 and global criterion value generated at step 240 may be evaluated to determine a message characterizing fit. In this way, the global criterion value can be contextualized by pertinent specific criteria values, thereby providing a comprehensive, text- and language-based output as an alternative to value-based outputs that lack meaning. In an embodiment, the evaluation of the global criterion and the specific criteria can be performed by decision tree, wherein specific criteria values inform and contextualize the global criterion found at an end of a branch of the decision tree. The global criterion (e.g., "fit", "no fit") may be provided alongside pertinent specific criteria (e.g. "color mismatch") that form the basis of the global criterion. The decision tree may be an annotated decision tree and include bifurcations defining varying semantic text templates, each bifurcation or path being defined by evaluations in specific criteria values and resulting in a global criterion value. Each resulting global criterion value can then be described using lay terminology contextualized by the features of the specific criteria, and informed by an ECP, that defined the path thereto (as described in step 260). In an embodiment, the resulting textual description can include textual translations of the reasons of bifurcation. An annotated decision tree described above will be further described with reference to FIG. 10A and FIG. 10B.

At step 260 of method 200, the message determined at step 250 may be output to the user. In an embodiment, the determined message may be directly provided as an output to the user. In another embodiment, the determined message may be modified according to automatic natural language generation tools to produce a more naturalized message in accordance with preferences and habits of the frame fit evaluation device. For instance, the modification may result in a given message being provided in multiple ways so as not to appear redundant and disingenuous when the same bifurcations of the tree are followed for different equipment. In an example, the result may be a rephrasing of the textual message or a different contextualization of the global criterion value by the specific criteria values. Instead of defining the global criterion value by dimensions of the equipment relative to the face of the user, the global criterion value may be defined according to, as a specific criteria value, a color of the equipment relative to a skin color of the user. In an embodiment, the automatic natural language generation tools may consider impact of certain specific criteria on the global criterion value such that, when providing alternative humanoid explanations for a global criterion value, the textual context may be meaningful. For instance, a color of equipment and dimensions of the equipment may be specific criteria with equal impact on the global criterion value and, therefore, may be used interchangeably by the automatic natural language generation tools.

In an embodiment, the message can be output to the user by a variety of modalities including audio, video, haptic, and the like. In an example, the message can be delivered to the user by spoken word.

Focusing now on each step of method 200, step 210 and step 220 will be described in further detail with respect to FIG. 3A and FIG. 3B. FIG. 3A and FIG. 3B are each flow diagrams of a method for providing contextualized evaluation of an eyeglass frame, according to exemplary embodiments of the present disclosure.

Regarding FIG. 3A, step 210 of method 200 and step 220 of method 200 are performed concurrently and each are performed on separate images and/or data. For instance, a user may provide an image of their face and wish to request a contextualized evaluation of a hypothetical match between the image and selected equipment from an equipment database.

Accordingly, at step 311 of method 201, user features may be extracted from, at step 312, a user image of a face of the user or from user features stored within a user features database. The user features database may include a user profile associated with the user, wherein user features have been input by the user for storage and access. The user features may be morphological features, structural features, visual prescriptions, and aesthetic features of the face of the user. At step 321 of method 201, equipment features may be extracted from, at step 322, an equipment image of equipment or from equipment features stored within an equipment features database. The equipment features database may include equipment features associated with a plurality of equipment stored in an online inventory, each set of equipment features defining structural features, aesthetic features, and visual features of the equipment. Alternatively, as suggested, the user features and the equipment features can be extracted from respective images at step 311 and step 321.

Similar to method 200 of FIG. 2, the user features and the equipment features extracted at step 311 and step 321 can be applied to a model of specific criteria at step 331 of method 201. With application of the model on the user features and the equipment features, values of specific criteria metrics can be generated according to a set of specific criteria metrics directed to suitability of equipment relative to a face of a user. The suitability of equipment may be defined according to particular morphological, aesthetic, or visual considerations. In an embodiment, the specific criteria can be numeric values and continuous quantities, such as probabilities, combinations of quantities, scores, and the like. In an embodiment, the specific criteria can be qualitative quantities that may be defined by alphanumeric values.

Similar to method 200 of FIG. 2, the values of specific criteria determine at step 331 of method 201 can be applied to a model of global criterion at step 341 of method 201. A resulting global criterion value can be a numeric or qualitative value indicating a global suitability of equipment to the face of the user. In an embodiment, a machine learning-based model may be used to generate the global criterion value from the generated specific criteria values. The machine learning-based model may be a decision tree generated by a classification and regression tree or may be a linear regression of the specific criteria values.

Having generated the specific criteria values and the global criterion value via, in an example, an annotated decision tree, method 201 can return to method 200 of FIG. 2 wherein a message can be determined and output to a user at steps 250 and 260, respectively.

Regarding FIG. 3B, step 210 of method 200 and step 220 of method 200 are performed concurrently and each are performed on images and/or data reflecting an image of a face of a user wearing equipment. For instance, a user may provide an image of their face wearing equipment and may wish to request a contextualized evaluation of the 'fit' therebetween. It can be appreciated that such an instance may be relevant when a user is at a retail store and is trying on a variety of equipment, or when the user is online shopping and is virtually 'trying on' a variety of equipment.

Accordingly, at step 311 of method 201, user features may be extracted from, at step 302, a user image of a face of the user wearing equipment. The user features may be morphological features, structural features, and aesthetic features of the face of the user. At step 321 of method 201, equipment features may be extracted from, at step 302, the user image of the face of the user wearing the equipment. The equipment features may define structural features, aesthetic features, and visual features of the equipment.

Similar to method 200 of FIG. 2, the user features and the equipment features extracted at step 311 and step 321 can be applied to a model of specific criteria at step 331 of method 201. With application of the model to the user features and the equipment features, values of specific criteria metrics can be generated according to a set of specific criteria metrics directed to suitability of equipment and a face of a user. The suitability of equipment may be defined according to particular morphological, aesthetic, or visual considerations. In an embodiment, the specific criteria can be numeric values and continuous quantities, such as probabilities, combinations of quantities, scores, and the like. In an embodiment, the specific criteria can be qualitative quantities that may be defined by alphanumeric values.

Similar to method 200 of FIG. 2, the values of specific criteria determine at step 331 of method 201 can be applied to a model of global criterion at step 341 of method 201. A resulting global criterion value can be a numeric or qualitative value indicating a global suitability of equipment to the face of the user. In an embodiment, a machine learning-based model may be used to generate the global criterion value from the generated specific criteria values. The machine learning-based model may be a decision tree generated by a classification and regression tree or may be a linear regression of the specific criteria values.

Having generated the specific criteria values and the global criterion value via, in an example, an annotated decision tree, method 201 can return to method 200 of FIG. 2 wherein a message can be determined and output to a user at steps 250 and 260, respectively.

In view of the above, FIG. 4A, FIG. 4B, and FIG. 4C represent possible inputs to method 200 of FIG. 2. In an example, a user may provide a user image 412 independent of equipment. In this way, the user may select any one of a number of images of equipment 422 that may be evaluated to provide a contextualized evaluation of the face of the user and the equipment. Alternatively, or as a virtual 'try on', the user may provide a user image 412 and equipment image 422 as a combined image 402 of the user wearing the equipment. In any of the cases presented above, the images may be processed in order to extract user features and equipment features.

The above descriptions have focused on a flow diagram as experienced by an end user. In an exemplary embodiment of the present disclosure, an end user may provide an image of their face wearing equipment. To allow for this operation, the specific criteria model and the global criterion model must be developed.

Figure 5:
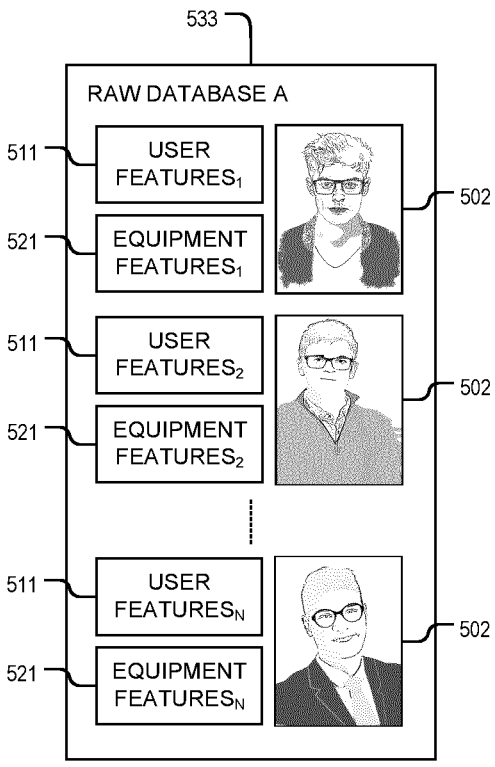
FIG. 5 is a schematic of a database including user features, equipment features, and corresponding images of users wearing equipment, according to an exemplary embodiment of the present disclosure.

With reference to FIG. 5, the specific criteria model can be initially developed by generating a database of user features, equipment features, and corresponding images of users wearing equipment. To this end, raw database A 533 may include a plurality of datasets comprising user features 511, equipment features 521, and corresponding images of the user wearing the equipment 502. The corresponding images of the user wearing the equipment 502 may be one image or a plurality of images. In an embodiment, the plurality of datasets of raw database A 533 may be a number of datasets sufficient to generate an accurate model of specific criteria while minimizing computational burdens.

According to an exemplary embodiment, the user features 511 may be extracted from the corresponding image of the user wearing the equipment 502, from an image of the user without the equipment, from morphological data associated with the user, and the like. The images may be acquired using a two-dimensional imaging device or a three-dimensional imaging device.

According to an exemplary embodiment, the equipment features 521 may be extracted from the corresponding image of the user wearing the equipment 502, from an image of the equipment without the face of the user, from structural data associated with the equipment according to a three-dimensional rendering of the design of the equipment, from structural data acquired by measurement using a frame trace device, or another source. The images may be acquired using a two-dimensional imaging device or a three-dimensional imaging device.

According to an exemplary embodiment, the image of the user wearing the equipment 502 can be an image of a real user wearing the equipment, an image of the real user wearing a virtual 'try on' of equipment, an image of a virtual user (i.e., an avatar) wearing a virtual 'try on' of equipment, and the like. User features 511 and equipment features 521 can be acquired therefrom according to the techniques described above.

Returning to method 200, the specific criteria model and the global criterion model can be developed based on the user features and the equipment features in consultation with ECPs. The specific criteria model and the global criterion model can be based on evaluations by ECPs of images of faces of users wearing equipment. By completing an ECP survey, as shown in FIG. 6B, the ECP can evaluate the image of the face of the user wearing the equipment according to a set of specific criteria related to aspects of the 'combined' image and according to a global criterion.

Figure 6A:
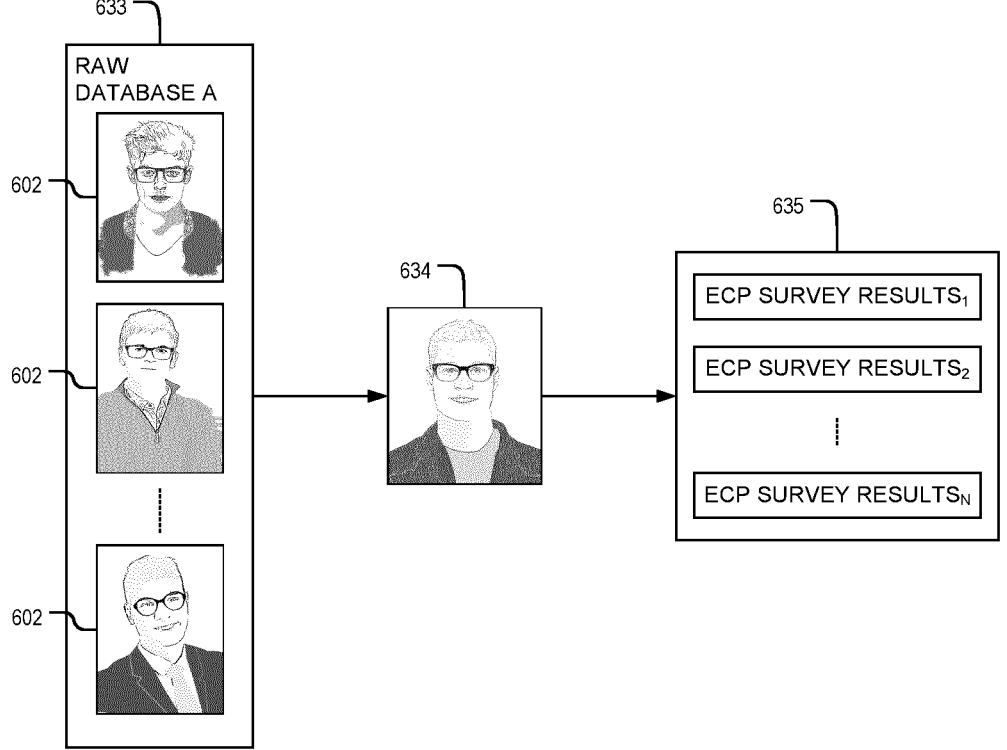
FIG. 6A is a flow diagram of an aspect of a method for providing contextual evaluation of an eyeglass frame, according to an exemplary embodiment of the present disclosure.

As an overview to the ECP evaluation process, and with reference to FIG. 6A, raw dataset A 633, including images of faces of users wearing equipment 602, may be evaluated by a plurality of ECPs 634 according to an ECP survey. Shown in FIG. 6B, the ECP survey may include specific criteria survey questions and a global criterion survey question. For instance, the survey may include, as specific criteria the following:

Specific Criteria 1: Provide feedback regarding the width of the equipment relative to the size of the head of the user. A high negative score indicates the width of the equipment is too small, while a high positive score indicates the width of the equipment is too large.

Specific Criteria 2: Provide feedback regarding the location of a pupil relative to a shape of the equipment/lens. A high negative score indicates the pupils are too close to the nose of the equipment/lens, while a high positive score indicates the pupils are too close to the temporal component. Not included in the ECP survey, but it should be noted that it is globally preferably for the pupils to be slightly closer to the nasal component.

Specific Criteria 3: Provide feedback regarding the horizontal location of an external component of the eyebrow relative to equipment shape.

Specific Criteria 4: Provide feedback regarding the vertical location of the eyebrow relative to the top aspect of the equipment.

Specific Criteria 5: Provide feedback regarding the vertical position of the bottom aspect of the equipment relative to the cheeks of the user.

Specific Criteria, 3, 4, and 5 can be evaluated on a similar continuum of negative and positive values.

Specific Criteria 6: Provide feedback regarding the bridge size of the equipment relative to the nose width of the user. A high negative score indicates the bridge is too narrow, while a high positive score indicates the bridge is too wide.

Figure 7A:
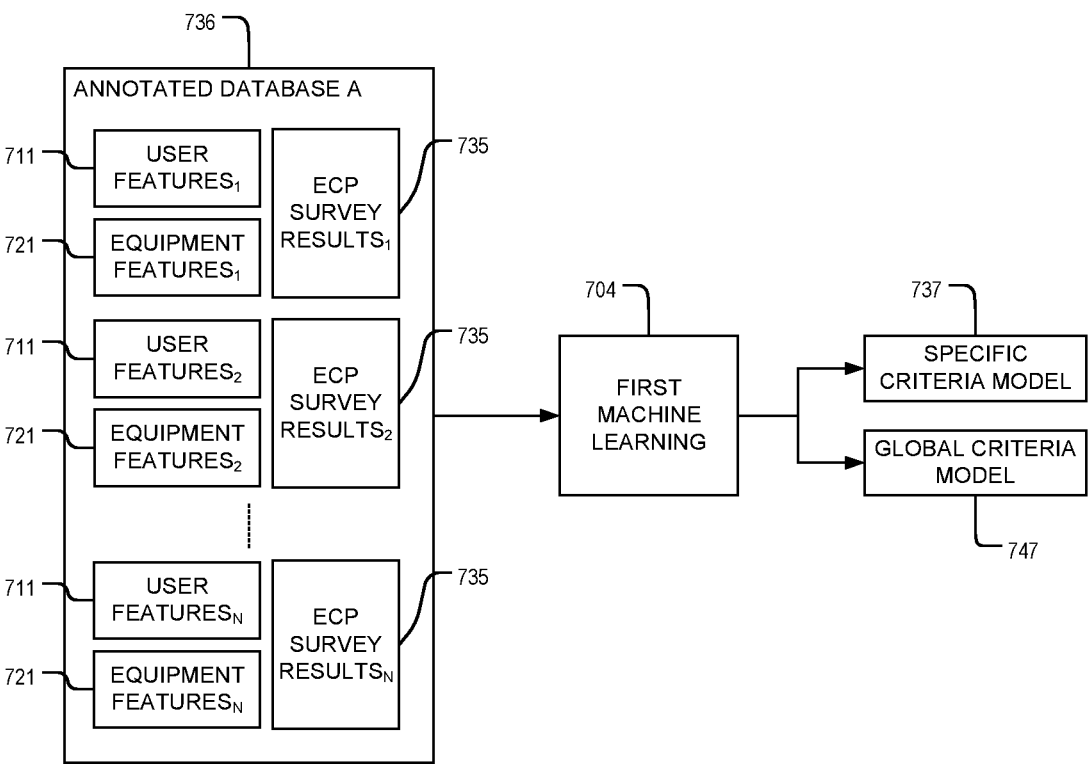
FIG. 7A is a flow diagram of an aspect of a method for providing contextual evaluation of an eyeglass frame, according to an exemplary embodiment of the present disclosure.

The results of each ECP survey associated with a dataset of user features, equipment features, and corresponding image of a user wearing equipment may be stored alongside the dataset in an annotated database A, discussed in further detail with reference to FIG. 7A. The results of each ECP survey, therefore, contribute to a model describing values of specific criteria and a model describing values of global criterion, wherein the models are based on the evaluation of the ECP of aspects of the proposed combination of the face of the user and the equipment.

In an embodiment, the results of each ECP survey can be used to provide constraints for mathematical expressions, equality and inequality conditions, and logical conditions that define each of the specific criteria model and the global criterion model according to user features and equipment features. Coefficients and parameters in such expressions can be obtained using machine learning-based tools, as will be discussed.

For instance, such expressions may be based on, for a given set of specific criteria ($Sc_1$, $Sc_2$, . . . , $Sc_N$), user features including temporal width of the face of the user, sphenoidal width of the face of the user, horizontal positions of gravity centers of eyelid openings of the user, mean vertical positions of the eyebrows of the user, length of the nose of the user, and the like, and equipment features including total width of the frame of the equipment, dimensions of aspects of the frame of the equipment (e.g., Size A, Size B, Size D, etc.), vertical thickness of the top aspect of the frame of the equipment, horizontal thickness of the frame of the equipment at the level of the hinge, color of the equipment, material of the equipment, and the like. In one expression related to $Sc_1$, the expression may be written as > $Sc_1$=too small if (temporal width–total equipment width>20 mm), okay if (temporal width–total equipment width≤20 mm and temporal width–total equipment width≥–20 mm), too large else In one expression related to $Sc_2$, the expression may be written as > $Sc_2$=too small if (sphenoidal width–(2$A$+$D$)>20 mm), okay if (sphenoidal width–(2$A$+$D$)≤20 mm and sphenoidal width–(2$A$+$D$)≥–20 mm), too large else where A represents 'Size A', a dimension of the frame of equipment, and B represents 'Size B', a dimension of the frame of equipment.

In one expression related to $Sc_3$, the expression may be written as

> $Sc_3$=eyebrow too high above the frame of the equipment if (max($Y\_EyeBrow$)–($Y_{top}$ of the frame of the equipment)>10 mm), eyebrow viewed inside the frames if max($Y\_EyeBrow$)–($Y_{top}$ of the frame of the equipment<=–5 mm), okay else In the above-described examples, thresholds defining boundaries between, for instance, being too small, okay, and too large, can be determined by machine learning-based approaches. The thresholds may be determined in view of the answer scale in use. For the instance, the answer scale may be textual bins describing three possible modes or numerical bins describing a fit scale between –5 and +5. In an embodiment, the thresholds may be defined by machine learning-based approaches applied to results of the ECP surveys shown in FIG. 6B. It can also be appreciated that thresholds may be dependent upon relationships and interactions between specific criteria, wherein $Sc_1$ may impact $Sc_3$, for instance.

Figure 8A:
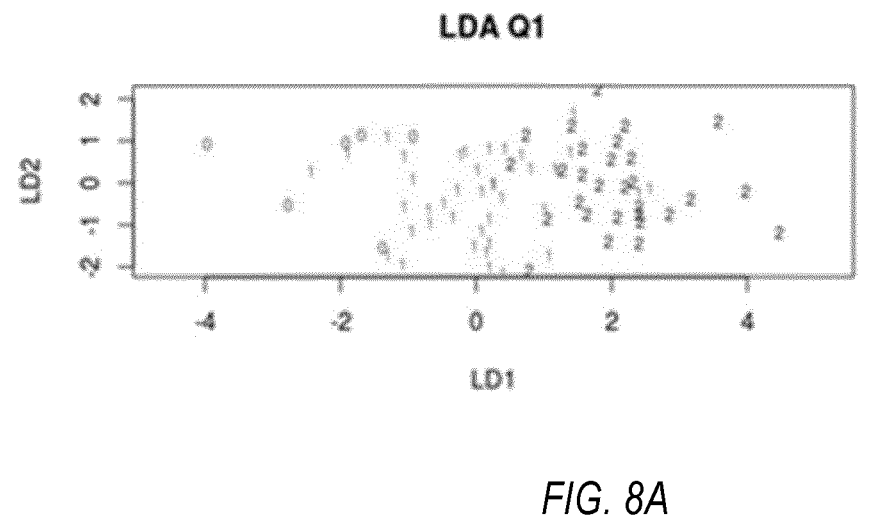
Figure 8B:
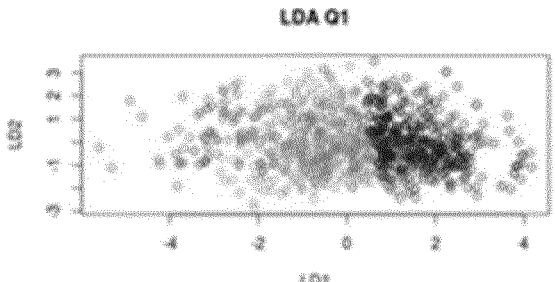
FIG. 8B is a graphical representation of estimated responses to a survey administered to eye care professionals, according to an exemplary embodiment of the present disclosure.

Alternatively, and as will be described more with reference to FIG. 8A and FIG. 8B, the specific criteria model and the global criterion model may also be developed according to statistical methods or other machine learning-based approaches as applied to results of the ECP surveys regarding the specific criteria and global criterion of a given user dataset. Such statistical methods may include linear discriminant analysis, for instance.

To this end, and according to an exemplary embodiment, an ECP survey may be directed to a dataset acquired from raw database A 533. The ECP survey may include a series of images of the user wearing the equipment 502 and, alongside each image, a series of questions regarding specific points of suitability of the equipment and the face of the person. For each question, the ECP may be given a limited number of possible answers. In an example, it may be a scale between –5 and +5, a scale between 0 and 10, or a choice of an item in a set of N items. Exemplary questions and answers, as submitted to an ECP during completion of an ECP survey, are described below.

Question 1. Relative to the width of the face of the user, how do you evaluate the width of the equipment? (a) too small, (b) okay, or (c) too large.

Question 2. Relative to the caliber of the equipment, how do you evaluate the pupils of the user? (a) too internal, (b) okay, or (c) too external.

Question 3. What do you think about the position of the external corners of the eyebrows of the user relative to the caliber of the equipment? (a) too internal, (b) okay, or (c) too external.

Question 4. Relative to the eyebrows of the user, how do you evaluate the position of the top of the frame of the equipment? (a) too low, (b) okay, or (c) too high.

Question 5. Relative to the cheeks of the user, how do you evaluate the position of the bottom of the frame of the equipment? (a) too low, (b) okay, or (c) too high.

Question 6. Relative to the nose of the wearer, how do you evaluate the bridge of the frame of the equipment? (a) too narrow, (b) okay, or (c) too large.

The above-described exemplary questions provide an introduction to myriad features that may be considered during development of the specific criteria model, as will be shown with respect to FIG. 7B through FIG. 7L. Moreover, though described above with reference to the specific criteria model, a similar approach may easily be implemented in the development of a global criteria model.

Accordingly, with reference to FIG. 7A, a flow diagram of generation of a specific criteria model and a global criterion model will now be described. Specifically, FIG. 7A depicts submission of a user dataset of annotated database A 736 to a first machine learning approach 704 in order to generate the specific criteria model 737. In an embodiment, submission of the user dataset of annotated database A 736 to the first machine learning approach 704 may also generate the global criterion model 747.

Annotated database A 736 includes the user features 711 and equipment features 721 of raw database A shown in FIG. 6A and the corresponding ECP survey results 735 acquired as shown in FIG. 6B. Datasets of annotated database A 736 can then be provided to the first machine learning approach 704.

According to an embodiment, the first machine learning approach 704 may be a linear discriminant analysis or similar approach for determining a linear combination of features that characterizes or separates a plurality of classes of objects or events, including neural networks and the like.

In an example, wherein the specific criteria model 737 is being generated, the first machine learning approach 704 may be a linear discriminant analysis (LDA), wherein the first machine learning approach 704 endeavors to explain the ECP survey results 735 by identifying statistical laws that link the ECP survey results 735 to user features 711 and equipment features 721. For instance, LDA according to the ECP survey results 735 may support a law giving the probabilities $(p_a, p_b, p_c)_i(i=1, 6)$ that a corresponding user and equipment are in a state a, b, c for a given question, i. The probabilities may be rewritten as $(p_a+p_b+p_c=1$ where $0 \le p_a \le 1$, $0 \le 1$, and $0 \le p_c \le 1)$, wherein values of $(p_a, p_b, p_c)_i$ describe specific criteria of the model. It can be appreciated that a similar approach may be used in determining the global criterion model.

Having applied the first machine learning approach 704 to the user datasets of annotated database A 736, the output of the first machine learning approach 704 can be appreciated as the specific criteria model 737 or as the global criterion model 747, as appropriate.

FIG. 7B through FIG. 7L provide illustrations of representative measurements of user features and equipment features that contribute to the specific criteria model and to the global criterion model.

Figures 7B, 7C, 7D:
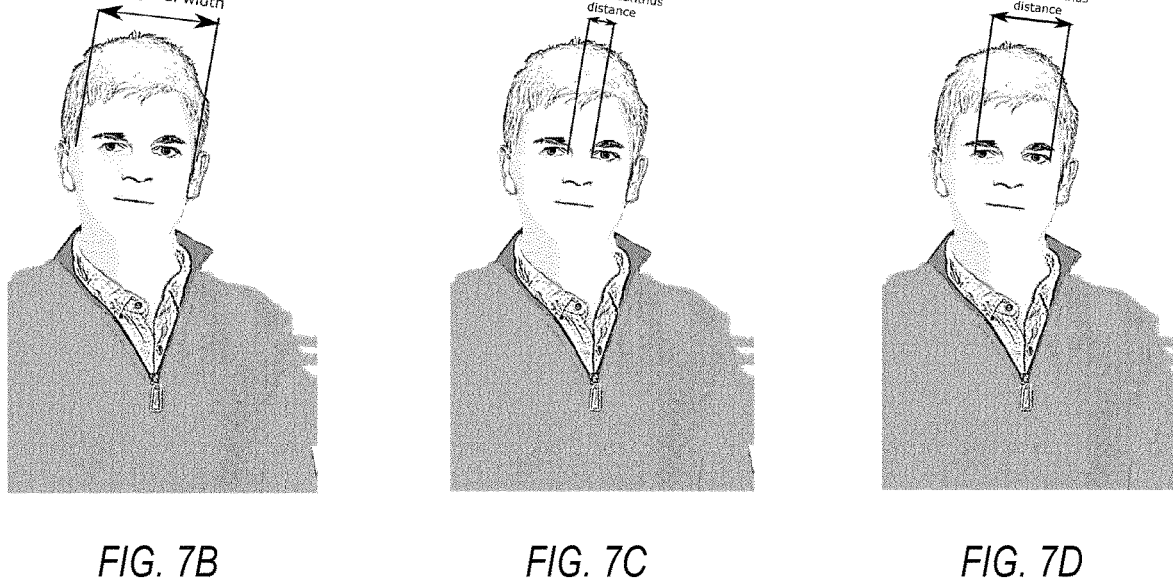
FIG. 7B is an illustration of metric used in determining a specific criterion, according to an exemplary embodiment of the present disclosure.
FIG. 7C is an illustration of metric used in determining a specific criterion, according to an exemplary embodiment of the present disclosure.
FIG. 7D is an illustration of metric used in determining a specific criterion, according to an exemplary embodiment of the present disclosure.

FIG. 7B is an illustration of a representative measurement of a value of temporal width of a user, according to an exemplary embodiment of the present disclosure.

FIG. 7C is an illustration of a representative measurement of a value of internal canthus distance of a user, according to an exemplary embodiment of the present disclosure.

FIG. 7D is an illustration of a representative measurement of a value of external canthus distance of a user, according to an exemplary embodiment of the present disclosure.

Figure 7E:
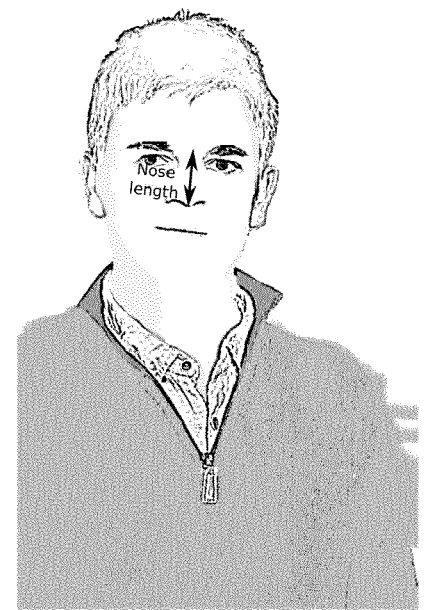
FIG. 7E is an illustration of metric used in determining a specific criterion, according to an exemplary embodiment of the present disclosure.

FIG. 7E is an illustration of a representative measurement of a value of nose length of a user, according to an exemplary embodiment of the present disclosure.

Figure 7F:
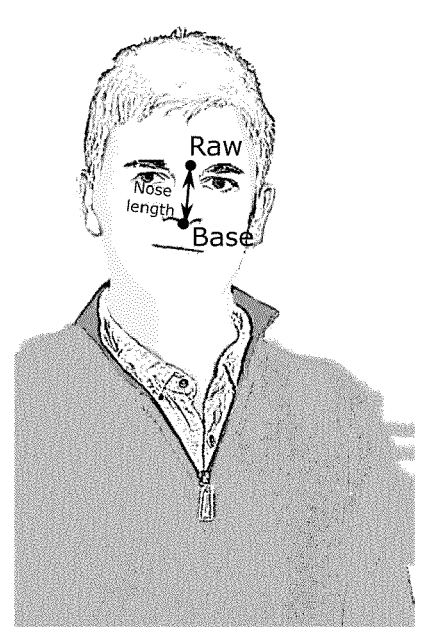
FIG. 7F is an illustration of metric used in determining a specific criterion, according to an exemplary embodiment of the present disclosure.

FIG. 7F is an illustration of a representative measurement of a value of nose length of a user based on a base and a raw as morphological features, according to an exemplary embodiment of the present disclosure.

Figure 7G:
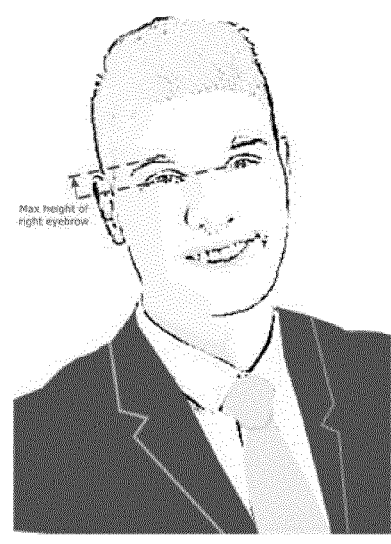
FIG. 7G is an illustration of metric used in determining a specific criterion, according to an exemplary embodiment of the present disclosure.

FIG. 7G is an illustration of a representative measurement of a value of maximum height of the right eyebrow of a user, according to an exemplary embodiment of the present disclosure.

Figure 7H:
FIG. 7H is an illustration of metric used in determining a specific criterion, according to an exemplary embodiment of the present disclosure.

FIG. 7H is an illustration of a representative measurement of a value of average height of the right eyebrow of a user, according to an exemplary embodiment of the present disclosure.

Figure 7I:
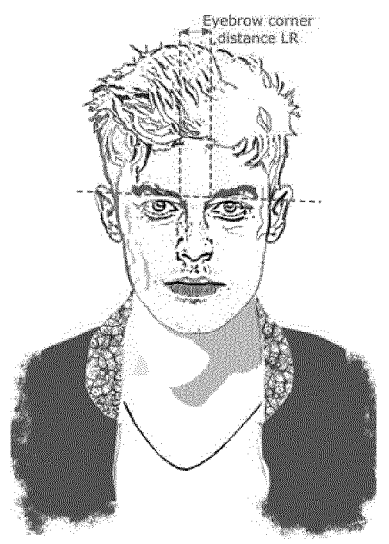
FIG. 7I is an illustration of metric used in determining a specific criterion, according to an exemplary embodiment of the present disclosure.

FIG. 7I is an illustration of a representative measurement of a value of a distance between medial corners of eyes of a user, according to an exemplary embodiment of the present disclosure.

Figure 7J:
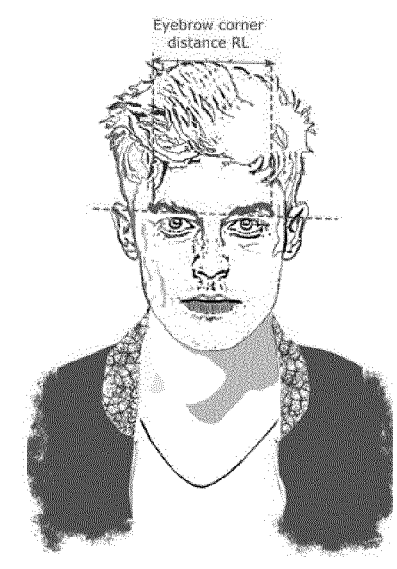
FIG. 7J is an illustration of metric used in determining a specific criterion, according to an exemplary embodiment of the present disclosure.

FIG. 7J is an illustration of a representative measurement of a value of a distance between lateral corners of eyes of a user, according to an exemplary embodiment of the present disclosure.

Figure 7K:
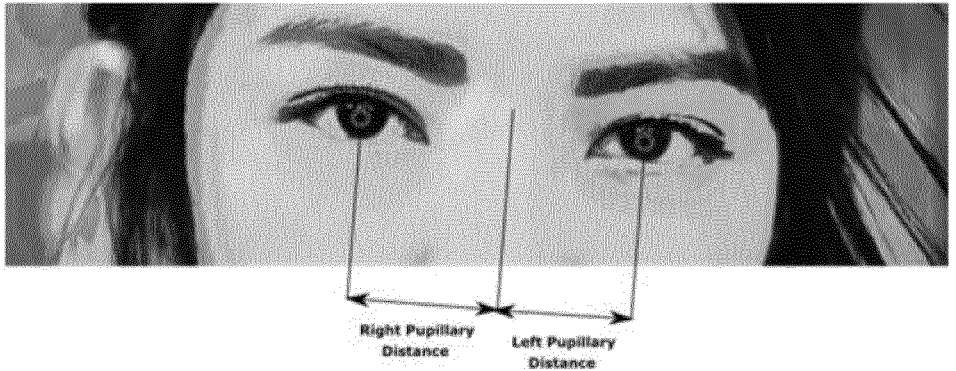
FIG. 7K is an illustration of metric used in determining a specific criterion, according to an exemplary embodiment of the present disclosure.

FIG. 7K is an illustration of a representative measurement of a value of a left pupillary distance and a right pupillary distance of eyes of a user, according to an exemplary embodiment of the present disclosure.

Figure 7L:
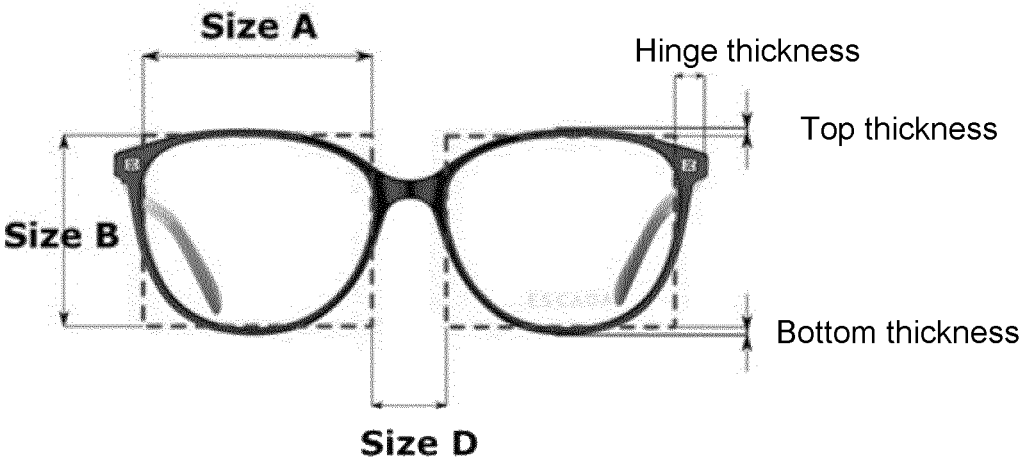
FIG. 7L is an illustration of metric used in determining a specific criterion, according to an exemplary embodiment of the present disclosure.

FIG. 7L is an illustration of a representative measurement of a value of a distance between medial corners of eyes of a user, according to an exemplary embodiment of the present disclosure.

As introduced above, relationships between the ECP survey results, the user features, and the equipment features may be defined according to implementation of the first machine learning approach or, in an example, a LDA. Accordingly, when applied to an unknown user dataset including user features and equipment features, LDA training will ensure an accurate classification thereof. Accordingly, FIG. 8A is a graphical representation of responses to the ECP survey to be used as training data, according to an exemplary embodiment of the present disclosure.

According to an embodiment, FIG. 8A can be appreciated in view of a specific question from the ECP survey, such as "Relative to the width of the face of the user, how do you evaluate the width of the equipment?" Responses to the question may be characterized numerically as (0) too small, (1) okay, or (2) too large. FIG. 8A demonstrates responses to the question considered as training data. Each response indicated by a number represents an evaluation of the question as it relates to an image of a user with corresponding equipment. The horizontal axis is the first discriminant axis (LD1) and the vertical axis is the second discriminant axis (LD2). Each is a linear combination of the variables used for the model. In the example of FIG. 8A, the linear combinations can be written as LD1=0.5291134*Size A+0.4516208*Size D−0.1110664*temporal width−0.1571796*hinge thickness−0.0956928*sphenoidal width and as LD2=0.05257000*Size A+0.64085819Size D+0.12367100*temporal width−0 0.09174694*hinge thickness−0.15042168*sphenoidal width where 'Size A', 'Size D', 'temporal width', 'hinge thickness', and 'sphenoidal width' are defined as described in FIG. 7B through FIG. 7L.

LD1 and LD2, as shown in FIG. 8A and as defined by the above expressions, provide maximal separation between the answers to the survey question: (0) too small, (1) okay, and (3) too large.

Having trained the LDA according to the ECP survey results and identified expressions of LD1 and LD2 that best separate the responses thereto, the LDA may be applied to unclassified user features and equipment features. Accordingly, FIG. 8B is a graphical representation of estimated responses to a survey administered to eye care professionals, according to an exemplary embodiment of the present disclosure. As in FIG. 8B, the LDA provides conditional probabilities for the frame of the equipment to be classified as (0) too small, (1) okay, or (2) too large for a face of a user. The data demonstrated in FIG. 8B reflects a maximal conditional probability.

Figure 9A:
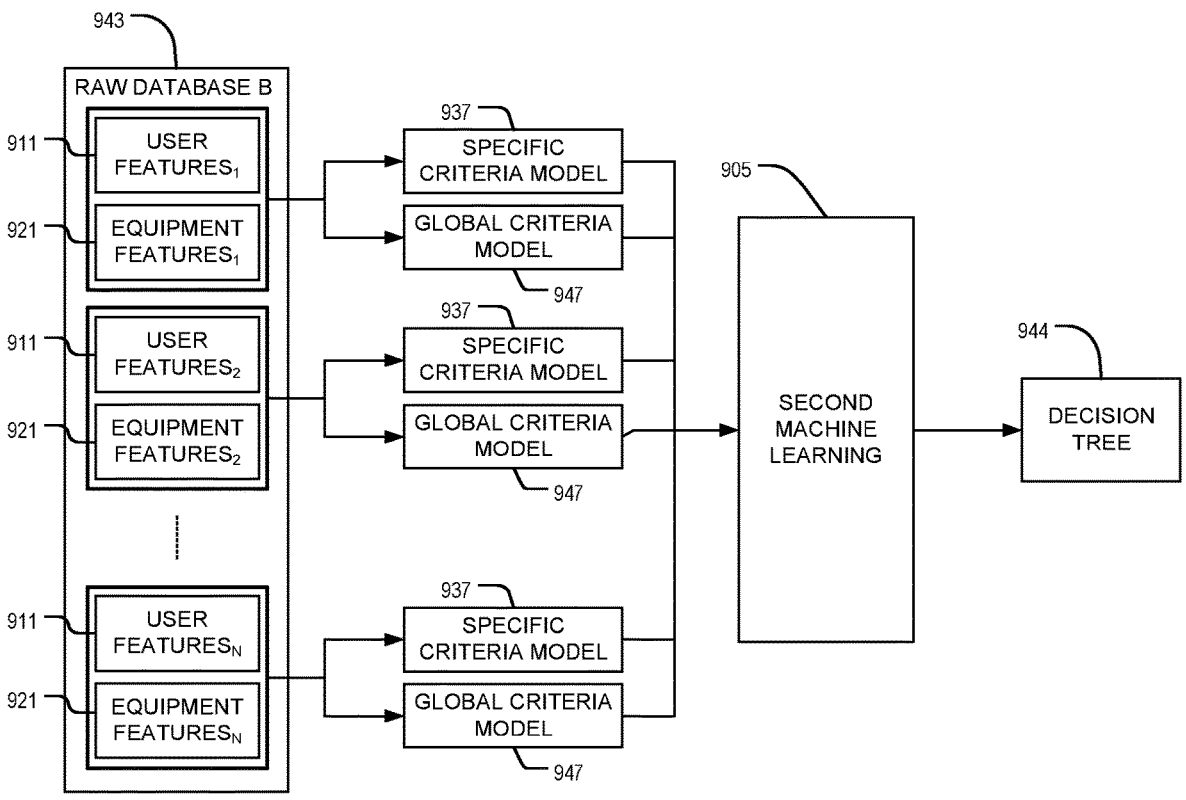
FIG. 9A is a flow diagram of an aspect of a method for providing contextual evaluation of an eyeglass frame, according to an embodiment of the present disclosure.

With reference now to the flow diagram of FIG. 9A, the specific criteria model and the global criterion model described above can be applied in the context of a new database of user datasets in order to generate relationships between global criterion and specific criteria. An output of the flow diagram of FIG. 9A can be a decision tree populated by specific criteria and with each branch of the decision tree ending in global criterion such that the global criterion can be explained by values of specific criteria that populate a same branch of the decision tree.

Specifically, user datasets from raw database B 943, having a structure similar to that of raw database A and annotated database A, can be submitted to both a specific criteria model 937 and to a global criterion model 947. Outputs of each of the specific criteria model 937 and the global criterion model 947 can then be supplied to a second machine learning approach 905 in order to generate a decision tree 944. The decision tree 944 may reflect relationships between the outputs of the specific criteria model 937 and the outputs of the global criterion model 947 as determined by the second machine learning approach 905. In an embodiment, the second machine learning approach 905 may be a classification and regression tree. For instance, if there are only a few discrete modes of each specific criteria (e.g., "too small", "okay", "too large"), then a classification tree can be implemented. In another instance, if each criteria can be described by a continuum (e.g., "–10 to +10), then a regression tree may be implemented.

Figure 9B:
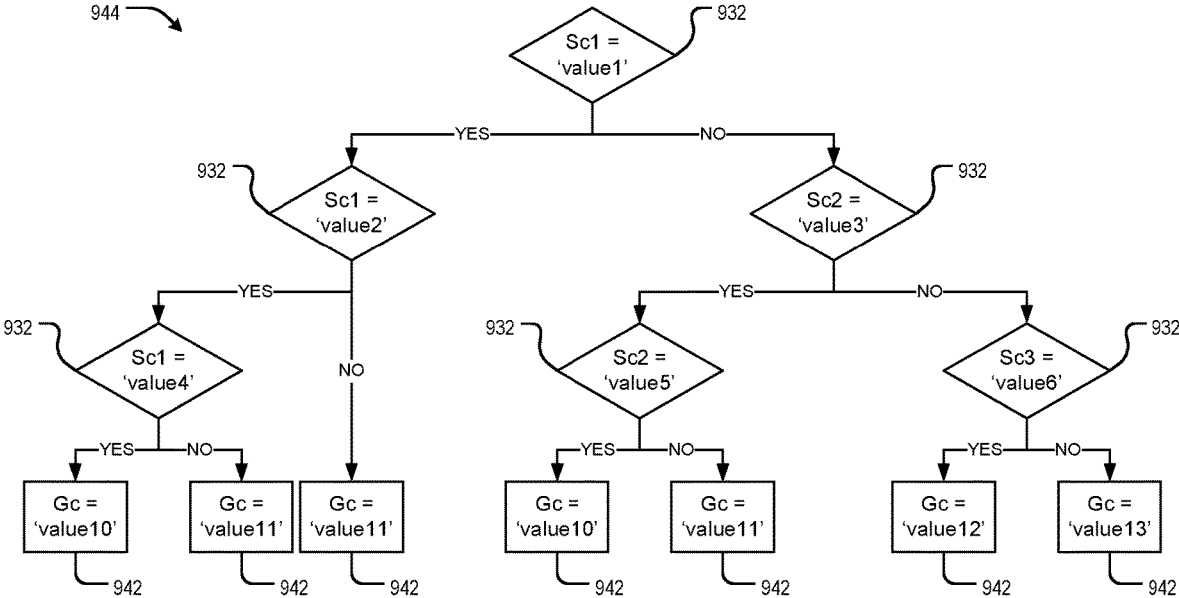
FIG. 9B is a flow diagram of a decision tree of an aspect of a method for providing contextual evaluation of an eyeglass frame, according to an embodiment of the present disclosure.

FIG. 9B is an exemplary decision tree determined according to the outputs of the specific criteria model and global criterion model and as applied to the second machine learning approach. It can be appreciated that each branch of the decision tree 944 can result in a global criterion value 942, wherein the global criterion value 942 is qualified by the values of the specific criteria 932 that populate the same branch of the decision tree 944.

Figure 10A:
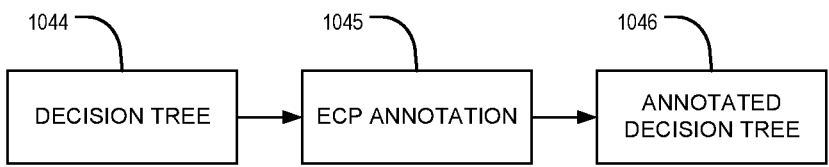
FIG. 10A is a flow diagram of an aspect of a method for providing contextual evaluation of an eyeglass frame, according to an embodiment of the present disclosure.

Referring now to FIG. 10A, the decision tree generated in FIG. 9A and FIG. 9B can be further processed in order to provide textual context regarding a fit of equipment relative to a face of a user. To this end, a decision tree 1044 generated by the second machine learning approach of FIG. 9A can be annotated by ECPs, the ECP annotation 1045 thereby contextualizing the decision tree 1044 and generating an annotated decision tree 1046, as shown in FIG. 10B.

In other words, while prior approaches may provide a global criterion value that reside on a scale of one to ten, one being a poor fit and ten being a good fit, the present disclosure provides a mechanism by which the global criterion value can be qualified according to specific criteria values generated based on the face of the user and the equipment being evaluated.

Figure 10B:
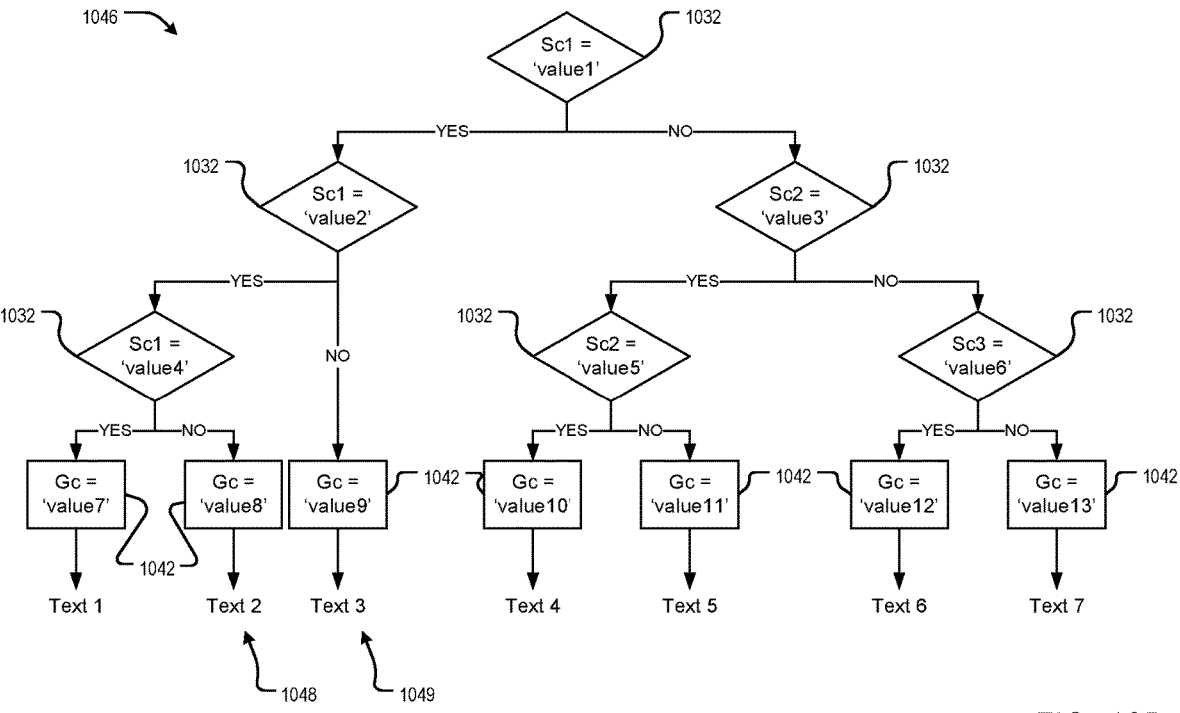
FIG. 10B is a flow diagram of an annotated decision tree of an aspect of a method for providing contextual evaluation of an eyeglass frame, according to an embodiment of the present disclosure.

In an embodiment, and as in FIG. 10B, a decision tree as in FIG. 9B can be annotated according to ECP opinion, resulting in an annotated decision tree 1046. Each branch of the annotated decision tree 1046, therefore, can include a textual context of the global criterion value 1042 based on the specific criteria values 1032 that populate the same branch. For instance, 'Text 2' 1048, as annotated by an ECP, may be "The width of the frame is a little bit too large for your relatively narrow face", thereby providing a frame fit evaluation in the context of specific features of the frame and the user. In another instance, "Text 3" 1049, as annotated by an ECP, may be "The width of this frame suits you but your eyes seen through it are a little off-center". Similarly, such annotation provides a frame fit evaluation alongside context regarding the position of the features of the user relative to the frame.

In an embodiment, and with reference again to method 200 of FIG. 2, the annotated decision tree 1046 can provide contextualized evaluations as fit message. The fit messages can then be output to a user to provide a frame fit evaluation, as previously described.

According to an embodiment, the method 200 of the present disclosure allows for a user to understand how and why equipment fits their face. To this end, the user may provide an image of themselves wearing equipment (i.e. eyeglass frames), and user features and equipment features can be calculated therefrom. The user features and equipment features may then be applied to the specific criteria model developed above to determine values of the specific criteria. Application of the specific criteria values to the annotated decision tree of FIG. 10B may allow for the determination of global fit criterion, wherein the path of the annotated decision tree provides context to the user in the form of a fit message.

Figure 11:
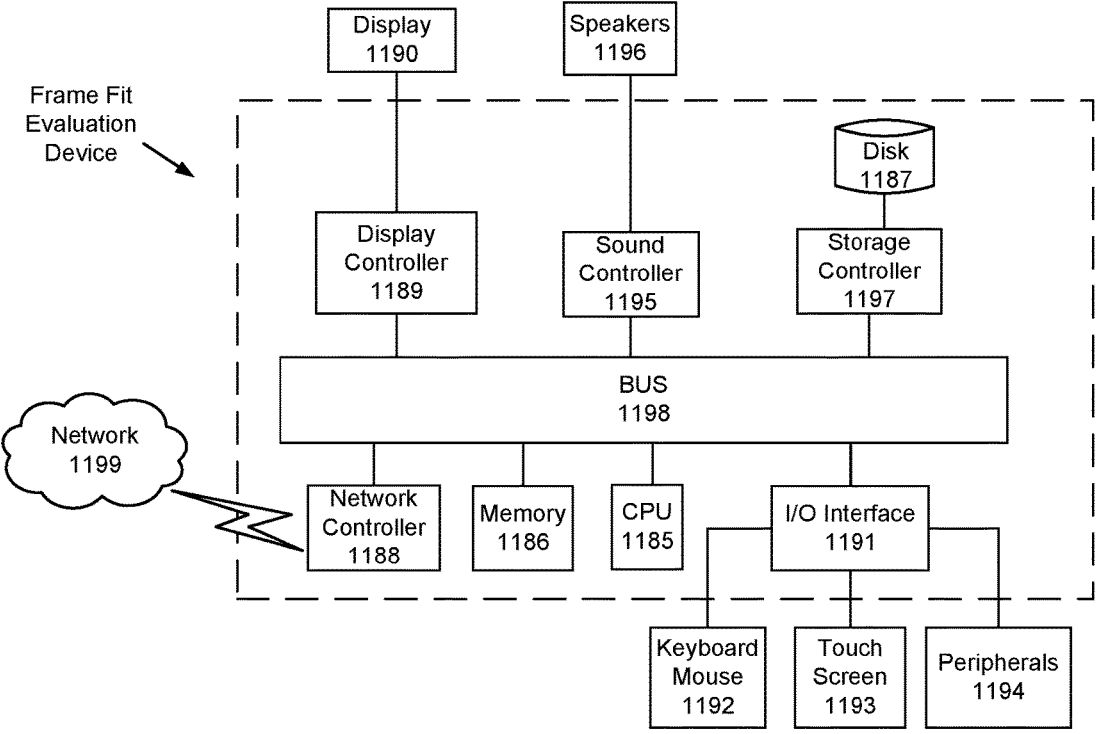
FIG. 11 is hardware configuration of a frame fit evaluation device, according to an exemplary embodiment of the present disclosure.

With reference now to FIG. 11, FIG. 11 is a hardware description of a frame fit evaluation device, according to an exemplary embodiment of the present disclosure.

In FIG. 11, the frame fit evaluation device includes a CPU 1185 which performs the processes described above. The frame fit evaluation device may be a general-purpose computer or a particular, special-purpose machine. In one embodiment, the frame fit evaluation device becomes a particular, special-purpose machine when the processor 1185 is programmed to perform visual equipment selection (and in particular, any of the processes discussed with reference to the above disclosure).

Alternatively, or additionally, the CPU 1185 may be implemented on an FPGA, ASIC, PLD or using discrete logic circuits, as one of ordinary skill in the art would recognize.

Further, CPU 1185 may be implemented as multiple processors cooperatively working in parallel to perform the instructions of the inventive processes described above.

The frame fit evaluation device also includes a network controller 1188, such as an Intel Ethernet PRO network interface card, for interfacing with network 1199. As can be appreciated, the network 1199 can be a public network, such as the Internet, or a private network such as an LAN or WAN network, or any combination thereof and can also include PSTN or ISDN sub-networks. The network 1199 can also be wired, such as an Ethernet network, or can be wireless such as a cellular network including EDGE, 3G and 4G wireless cellular systems. The wireless network can also be WiFi, Bluetooth, or any other wireless form of communication that is known.

The frame fit evaluation device further includes a display controller 1189, such as a graphics card or graphics adaptor for interfacing with display 1190, such as a monitor. A general purpose I/O interface 1191 interfaces with a keyboard and/or mouse 1192 as well as a touch screen panel 1193 on or separate from display 1190. General purpose I/O interface 1191 also connects to a variety of peripherals 1194 including printers and scanners. In an embodiment of the present disclosure, the peripherals 1194 may include a 2D or 3D camera, or other image capture device configured to acquire images of users, eyewear, and the like.

A sound controller 1195 is also provided in the frame fit evaluation device to interface with speakers/microphone 1196 thereby providing sounds and/or music.

The general purpose storage controller 1197 connects the storage medium disk 1187 with communication bus 1198, which may be an ISA, EISA, VESA, PCI, or similar, for interconnecting all of the components of the frame fit evaluation device. A description of the general features and functionality of the display 1190, keyboard and/or mouse 1192, as well as the display controller 1189, storage controller 1197, network controller 1188, sound controller 1195, and general purpose I/O interface 1191 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Figure 12:
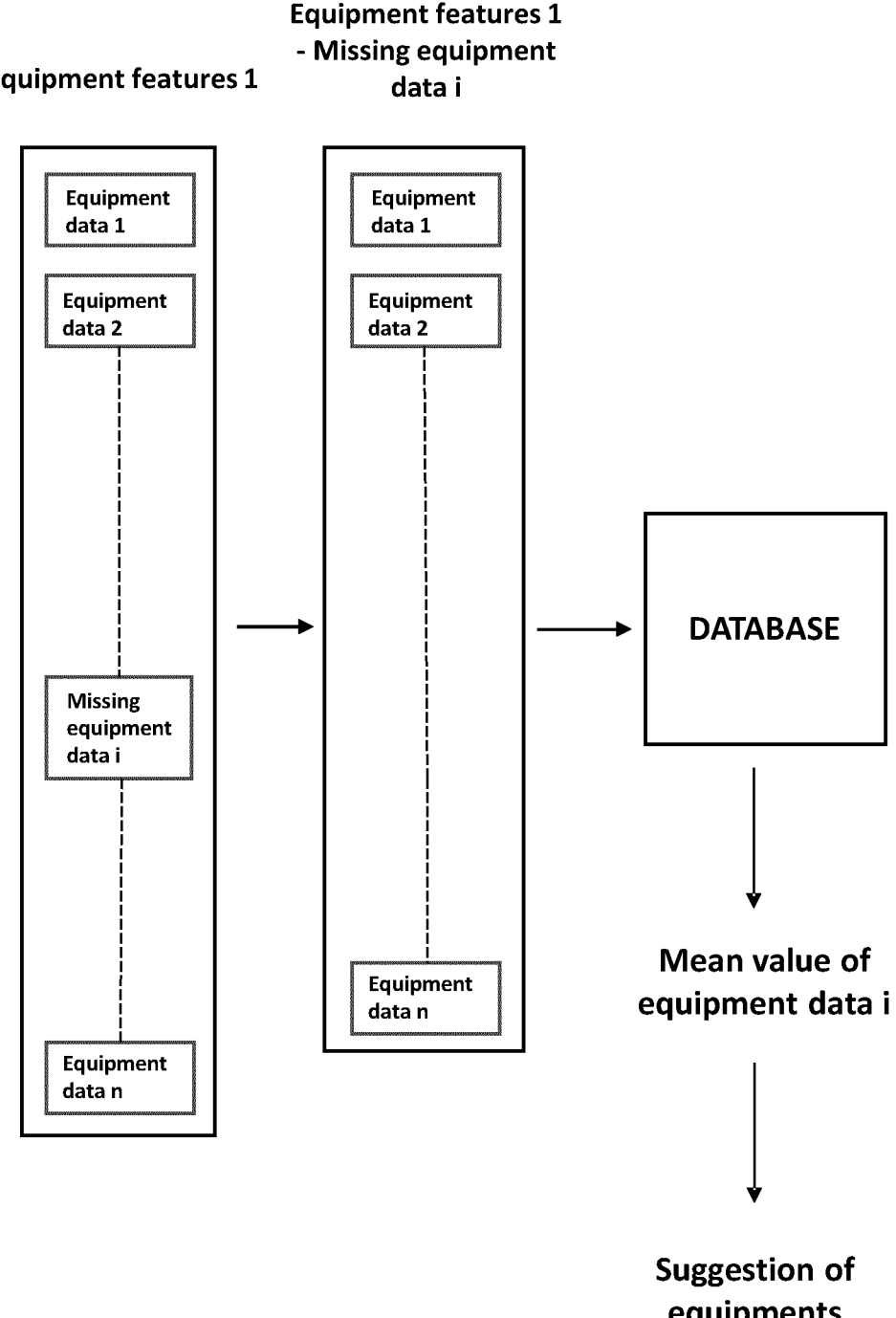
FIG. 12 is a flow diagram of an aspect of a method for providing a contextualized evaluation of an equipment data when other equipment data are provided.

FIG. 12, is a flow diagram of a method for providing a contextualized evaluation of an equipment data when other equipment data are provided. When presented with a first set of equipment data where an equipment data is missing, the set of data is compared to sets of data of a database comprising at least one set of equipment data. The mean value of the missing data from frames of the database having similar other features is then calculated. The database then provide suggestions of equipments having a missing data value equal or close to the calculated mean value of the missing data and having other values equal or close to the other values of the first set of equipment data.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method for providing contextual evaluation of an eyeglass frame on a face of a user, comprising receiving user data describing features of the face of the user, receiving equipment data describing features of the eyeglass frame, generating, according to a first model, values for a set of specific criteria describing compatibility between the face of the user and the eyeglass frame based on the received user data and the received equipment data, the first model trained to associate user data and equipment data with values of specific criteria, generating, by processing circuitry and according to a second model, a value of a global criterion based on the generated values for the set of specific criteria, the second model trained to associate the values of specific criteria with values of global criteria, determining a message characterizing the eyeglass frame with respect to the face of the user, the message being associated with the generated value of the global criterion and with the generated values for the set of specific criteria, and outputting the message to the user.

(2) The method of (1), wherein the outputting outputs the message to the user by applying a natural language generator to the determined message.

(3) The method of either (1) or (2), wherein the received user data is based on an image of the face of the user.

(4) The method of any one of (1) to (3), wherein the received equipment data is based on an image of the eyeglass frame.

(5) The method of any one of (1) to (4), wherein the first model is generated by applying a first machine learning to a database including user data, equipment data, and images of faces of users wearing eyeglass frames, the user data and the equipment data of the database being associated with a respective image of the images of faces of users wearing eyeglass frames in the database, the first machine learning being trained to associate the user data and the equipment data in the database with reference values of specific criteria and reference values of global criteria.

(6) The method of any one of (1) to (5), wherein the reference values of specific criteria and the reference values of global criteria are determined by human evaluation of the images of faces wearing eyeglass frames in the database.

(7) The method of any one of (1) to (6), wherein the human evaluation is performed by eye care professionals.

(8) The method of any one of (1) to (7), wherein the first machine learning is a linear discriminant analysis.

(9) The method of any one of (1) to (8), wherein the second model is generated by applying a second machine learning to reference values of specific criteria and reference values of global criteria, the second machine learning being trained to associate the reference values of specific criteria with the reference values of global criteria.

(10) The method of any one of (1) to (9), wherein the second model is a decision tree.

(11) An apparatus for providing contextual evaluation of an eyeglass frame on a face of a user, comprising processing circuitry configured to receive user data describing features of the face of the user, receive equipment data describing features of the eyeglass frame, determine, according to a first model, values for a set of specific criteria describing compatibility between the face of the user and the eyeglass frame based on the received user data and the received equipment data, the first model trained to associate user data and equipment data with values of specific criteria, generate, according to a second model, a value of a global criterion based on the generated values for the set of specific criteria, the second model trained to associate the values of specific criteria with values of global criteria, determine a message characterizing the eyeglass frame with respect to the face of the user, the message being associated with the generated value of the global criterion and with the generated values for the set of specific criteria, and output the message to the user.

(12) The apparatus of (11), wherein the first model is generated by applying a first machine learning to a database including user data, equipment data, and images of faces of users wearing eyeglass frames, the user data and the equipment data of the database being associated with a respective image of the images of faces of users wearing eyeglass frames in the database, the first machine learning being trained to associate the user data and the equipment data in the database with reference values of specific criteria and reference values of global criteria.

(13) The apparatus of either (11) or (12), wherein the reference values of specific criteria and the reference values of global criteria are determined by human evaluation of the images of faces wearing eyeglass frames in the database, the human evaluation being performed by eye care professionals.

(14) The apparatus of any one of (11) to (13), wherein the second model is generated by applying a second machine learning to reference values of specific criteria and reference values of global criteria, the second machine learning being trained to associate the reference values of specific criteria with the reference values of global criteria.

(15) A non-transitory computer-readable storage medium storing computer-readable instructions that, when executed by a computer, cause the computer to perform a method for providing contextual evaluation of an eyeglass frame on a face of a user, comprising receiving user data describing features of the face of the user, receiving equipment data describing features of the eyeglass frame, generating, according to a first model, values for a set of specific criteria describing compatibility between the face of the user and the eyeglass frame based on the received user data and the received equipment data, the first model trained to associate user data and equipment data with values of specific criteria, generating, according to a second model, a value of a global criterion based on the generated values for the set of specific criteria, the second model trained to associate the values of specific criteria with values of global criteria, determining a message characterizing the eyeglass frame with respect to the face of the user, the message being associated with the generated value of the global criterion and with the generated values for the set of specific criteria, and outputting the message to the user.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for providing contextual evaluation of an eyeglass frame on a face of a user when an incomplete set of equipment data are provided, the method comprising:

receiving user data describing features of the face of the user;

receiving eyeglass frame equipment data describing features of the eyeglass frame in a case in which some equipment data is missing from the set of incomplete equipment data;

comparing the set of incomplete equipment data to one set of data of at least one set of equipment data of a database configured to store the at least one set of equipment data;

calculating a mean value of the missing equipment data from frames stored in the database having similar other features;

generating, according to a first model, values for a set of specific criteria describing compatibility between the face of the user and the eyeglass frame based on the received user data, the received equipment data, and the calculated mean value of the missing equipment data, the first model trained to associate user data and equipment data with values of specific criteria;

generating, by processing circuitry and according to a second model, a value of a global criterion based on the generated values for the set of specific criteria, the second model trained to associate the values of specific criteria with values of global criteria;

determining a message characterizing the eyeglass frame with respect to the face of the user, the message being associated with the generated value of the global criterion and with the generated values for the set of specific criteria; and outputting the message to the user.

2. The method of claim 1, wherein the outputting outputs the message to the user by applying a natural language generator to the determined message.

3. The method of claim 1, wherein the received user data is based on an image of the face of the user.

4. The method of claim 1, wherein the received equipment data is based on an image of the eyeglass frame.

5. The method of claim 1, wherein the first model is generated by applying a first machine learning to a database including user data, equipment data, and images of faces of users wearing eyeglass frames, the user data and the equipment data of the database being associated with a respective image of the images of faces of users wearing eyeglass frames in the database, the first machine learning being trained to associate the user data and the equipment data in the database with reference values of specific criteria and reference values of global criteria.

6. The method of claim 5, wherein the reference values of specific criteria and the reference values of global criteria are determined by human evaluation of the images of faces wearing eyeglass frames in the database.

7. The method of claim 6, wherein the human evaluation is performed by eye care professionals.

8. The method of claim 5, wherein the first machine learning is a linear discriminant analysis.

9. The method of claim 1, wherein the second model is generated by applying a second machine learning to reference values of specific criteria and reference values of global criteria, the second machine learning being trained to associate the reference values of specific criteria with the reference values of global criteria.

10. The method of claim 6, wherein the second model is a decision tree.

11. An apparatus for providing contextual evaluation of an eyeglass frame on a face of a user when an incomplete set of equipment data is provided, the apparatus comprising:

processing circuitry configured to receive user data describing features of the face of the user, receive eyeglass frame equipment data describing features of the eyeglass frame in a case in which some equipment data is missing from the set of incomplete equipment data, compare the set of incomplete equipment data to one set of data of at least one set of equipment data of a database configured to store the at least one set of equipment data, calculate a mean value of the missing equipment data from frames stored in the database having similar other features, determine, according to a first model, values for a set of specific criteria describing compatibility between the face of the user and the eyeglass frame based on the received user data, the received equipment data, and the calculated mean value of the missing equipment data, the first model trained to associate user data and equipment data with values of specific criteria, generate, according to a second model, a value of a global criterion based on the generated values for the set of specific criteria, the second model trained to associate the values of specific criteria with values of global criteria, determine a message characterizing the eyeglass frame with respect to the face of the user, the message being associated with the generated value of the global criterion and with the generated values for the set of specific criteria, and output the message to the user.

12. The apparatus of claim 11, wherein the first model is generated by applying a first machine learning to a database including user data, equipment data, and images of faces of users wearing eyeglass frames, the user data and the equipment data of the database being associated with a respective image of the images of faces of users wearing eyeglass frames in the database, the first machine learning being trained to associate the user data and the equipment data in the database with reference values of specific criteria and reference values of global criteria.

13. The apparatus of claim 12, wherein the reference values of specific criteria and the reference values of global criteria are determined by human evaluation of the images of faces wearing eyeglass frames in the database, the human evaluation being performed by eye care professionals.

14. The apparatus of claim 11, wherein the second model is generated by applying a second machine learning to reference values of specific criteria and reference values of global criteria, the trained to second machine learning being associate the reference values of specific criteria with the reference values of global criteria.

15. A non-transitory computer-readable storage medium storing computer-readable instructions that, when executed by a computer, cause the computer to perform a method for providing contextual evaluation of an eyeglass frame on a face of a user, comprising:

receiving user data describing features of the face of the user;

receiving eyeglass frame equipment data describing features of the eyeglass frame in a case in which some equipment data is missing from the set of incomplete equipment data;

comparing the set of incomplete equipment data to one set of data of at least one set of equipment data of a database configured to store the at least one set of equipment data;

calculating a mean value of the missing equipment data from frames stored in the database having similar other features;

generating, according to a first model, values for a set of specific criteria describing compatibility between the face of the user and the eyeglass frame based on the received user data, the received equipment data, and the calculated mean value of the missing equipment data, the first model trained to associate user data and equipment data with values of specific criteria;

generating, according to a second model, a value of a global criterion based on the generated values for the set of specific criteria, the second model trained to associate the values of specific criteria with values of global criteria;

determining a message characterizing the eyeglass frame with respect to the face of the user, the message being associated with the generated value of the global criterion and with the generated values for the set of specific criteria; and outputting the message to the user.

* * * * *